US011628708B2

(12) United States Patent
Bomers (10) Patent No.: US 11,628,708 B2
(45) Date of Patent: Apr. 18, 2023

(54) CONNECTION APPARATUS AND METHODS FOR COMMUNICATION WITH MOVABLE ELECTRO-OPTIC WINDOW SYSTEMS (71) Applicant: Gentex Corporation, Zeeland, MI (US)

(72) Inventor: Luke A. Bomers, Grandville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 877 days.

(21) Appl. No.: 16/506,084

(22) Filed: Jul. 9, 2019

(65) Prior Publication Data
US 2020/0016963 A1 Jan. 16, 2020

Related U.S. Application Data (60) Provisional application No. 62/697,143, filed on Jul. 12, 2018.

(51) Int. Cl.
*B60J 3/04* (2006.01)
*B60J 7/043* (2006.01)
(Continued)

(52) U.S. Cl.
CPC ............... *B60J 3/04* (2013.01); *B60J 7/0007* (2013.01); *B60J 7/0015* (2013.01); *B60J 7/043* (2013.01);
(Continued)

(58) Field of Classification Search
CPC ..... B60J 3/04; B60J 7/00; B60J 7/0007; B60J 7/0015; B60J 7/043; B60J 7/0435; B60J 7/057; B60J 7/0573; B60J 1/2016; B60J 1/2019; B60J 1/2022; B60J 1/2025; B60J 1/2027; B60Q 3/53; B60Q 3/70;
(Continued)

(56) References Cited

U.S. PATENT DOCUMENTS 4,634,945 A 1/1987 Takemura et al.
5,261,722 A * 11/1993 Staley .................. B60J 7/02
296/211
(Continued)

FOREIGN PATENT DOCUMENTS

EA 000256 B1 2/1999
FR 2917770 A1 12/2008
RU 2061605 C1 6/1996

*Primary Examiner* — Dennis H Pedder
*Assistant Examiner* — Joyce Eileen Hill
(74) *Attorney, Agent, or Firm* — Price Heneveld LLP; Brian James Brewer (57) ABSTRACT A vehicle apparatus configured to selectively position and enclose an opening formed in at least one panel of a vehicle includes a sliding panel and a positioning mechanism. The sliding panel includes an electrical device in communication with a control circuit of the vehicle and the positioning mechanism is configured to slidably position the sliding panel along a positioning track between an open position and a closed position. A control connection is configured to transmit control signals between the control circuit of the vehicle and the electrical device. The control connection
(Continued)

extends from a portion of the vehicle to a connection interface of the electrical device, and the connection apparatus is configured to communicate a control signal to adjust an operating state of the electrical device in both the open position and the closed position.

13 Claims, 7 Drawing Sheets

(51) Int. Cl.
| | |
|---|---|
| *B60J 7/00* | (2006.01) |
| *B60J 7/047* | (2006.01) |
| *B60J 7/057* | (2006.01) |
| *B60J 1/20* | (2006.01) |
| *B60Q 3/53* | (2017.01) |
| *B60Q 3/208* | (2017.01) |
| *B60Q 3/70* | (2017.01) |
| *G02F 1/00* | (2006.01) |

(52) U.S. Cl.
CPC ............... *B60J 7/047* (2013.01); *B60J 7/057* (2013.01); *B60J 7/0573* (2013.01); *B60Q 3/208* (2017.02); *B60Q 3/53* (2017.02); *B60Q 3/70* (2017.02); *G02F 1/0018* (2013.01); *B60J 1/2019* (2013.01)

(58) Field of Classification Search
CPC ......... B60Q 3/72; B60Q 3/208; G02F 1/0018; G02F 1/155; G02F 1/163; E05F 15/43; E05F 15/431; E05F 15/659; E05Y 2400/00; E05Y 2400/10; E05Y 2400/302

USPC ........ 701/36; 362/490; 700/19, 20; 296/211, 296/214, 216.01, 216.02, 216.03, 216.04, 296/216.05, 223

See application file for complete search history.

(56) References Cited

U.S. PATENT DOCUMENTS

| | | |
|---|---|---|
| 5,805,330 A | 9/1998 | Byker et al. |
| 5,940,201 A | 8/1999 | Ash et al. |
| 6,137,620 A | 10/2000 | Guarr et al. |
| 6,239,898 B1 | 5/2001 | Byker et al. |
| 6,407,847 B1 | 6/2002 | Poll et al. |
| 6,433,914 B1 | 8/2002 | Lomprey et al. |
| 6,567,708 B1 | 5/2003 | Bechtel et al. |
| 6,597,489 B1 | 7/2003 | Guarr et al. |
| 6,688,681 B2 | 2/2004 | Birt |
| 6,877,790 B2 * | 4/2005 | Queveau .................. B60J 7/028 296/108 |
| 7,085,609 B2 | 8/2006 | Bechtel et al. |
| 7,372,611 B2 | 5/2008 | Tonar et al. |
| 8,547,624 B2 | 10/2013 | Ash et al. |
| 9,964,828 B2 | 5/2018 | Theiste et al. |
| 2011/0254324 A1* | 10/2011 | De Bie ..................... B60J 7/05 296/223 |
| 2015/0124071 A1 | 5/2015 | DeLine et al. |
| 2015/0224856 A1* | 8/2015 | Snider ................... B60J 7/0015 296/97.8 |
| 2015/0367782 A1* | 12/2015 | Mannheim Astete .. B32B 17/00 349/12 |
| 2016/0118519 A1* | 4/2016 | Yang ....................... B60J 7/043 136/244 |
| 2017/0100991 A1 | 4/2017 | Cammenga et al. |
| 2018/0170181 A1* | 6/2018 | Tan .......................... B60N 2/22 |
| 2019/0202349 A1* | 7/2019 | Winton .................. B60Q 3/208 |

* cited by examiner

CONNECTION APPARATUS AND METHODS FOR COMMUNICATION WITH MOVABLE ELECTRO-OPTIC WINDOW SYSTEMS

CROSS-REFERENCE TO RELATED APPLICATIONS

This application claims priority under 35 U.S.C. § 119(e) and the benefit of U.S. Provisional Application No. 62/697,143 entitled CONNECTION APPARATUS AND METHODS FOR COMMUNICATION WITH MOVABLE ELECTRO-OPTIC WINDOW SYSTEMS, filed on Jul. 12, 2018, by Luke A. Bomers, the entire disclosure of which is incorporated herein by reference.

TECHNOLOGICAL FIELD

The present disclosure relates generally to a control system for an electro-optic device and, more particularly, relates to a multi-zone control system for a plurality of electro-optic devices.

SUMMARY

In one aspect of the disclosure, a vehicle apparatus is disclosed. The apparatus is configured to selectively position and enclose an opening formed in at least one panel of a vehicle comprises a sliding panel and a positioning mechanism. The sliding panel comprises an electrical device in communication with a control circuit of the vehicle and the positioning mechanism is configured to slidably position the sliding panel along a positioning track between an open position and a closed position. A control connection is configured to transmit a control signals between the control circuit of the vehicle and the electrical device. The control connection extends from a portion of the vehicle to a connection interface of the electrical device, and the connection apparatus is configured to communicate a control signal to adjust an operating state of the electrical device in both the open position and the closed position.

In another aspect of the disclosure, a method for supplying a control signal to an electrical device incorporated in a sliding panel of a vehicle is disclosed. The method comprises controlling a position of the sliding panel from an opened position to a closed position and maintaining an electrical communication with the electrical device between the open position to a closed position. The method further comprises communicating control signals thereby controlling a state of the electrical device in the opened position, the closed position, and intermediate positions therebetween.

In yet another aspect of the disclosure, a vehicle apparatus configured to selectively position and enclose an opening formed in at least one panel of a vehicle is disclosed. The apparatus comprises a window element comprising an electro-optic apparatus in communication with a control circuit of the vehicle. A positioning mechanism is configured to slidably position the window element along a positioning track between an open position and a closed position. A control connection is configured to transmit a control signals between the control circuit of the vehicle and the electro-optic apparatus, wherein the control connection extends from a portion of the vehicle to a connection interface of the electrical device. The connection apparatus is configured to communicate a control signal to adjust an operating state of the electrical device in both the open position and the closed position. The control signal is configured to adjust a transmission property of the electro-optic apparatus in response in both the open position and the closed position.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
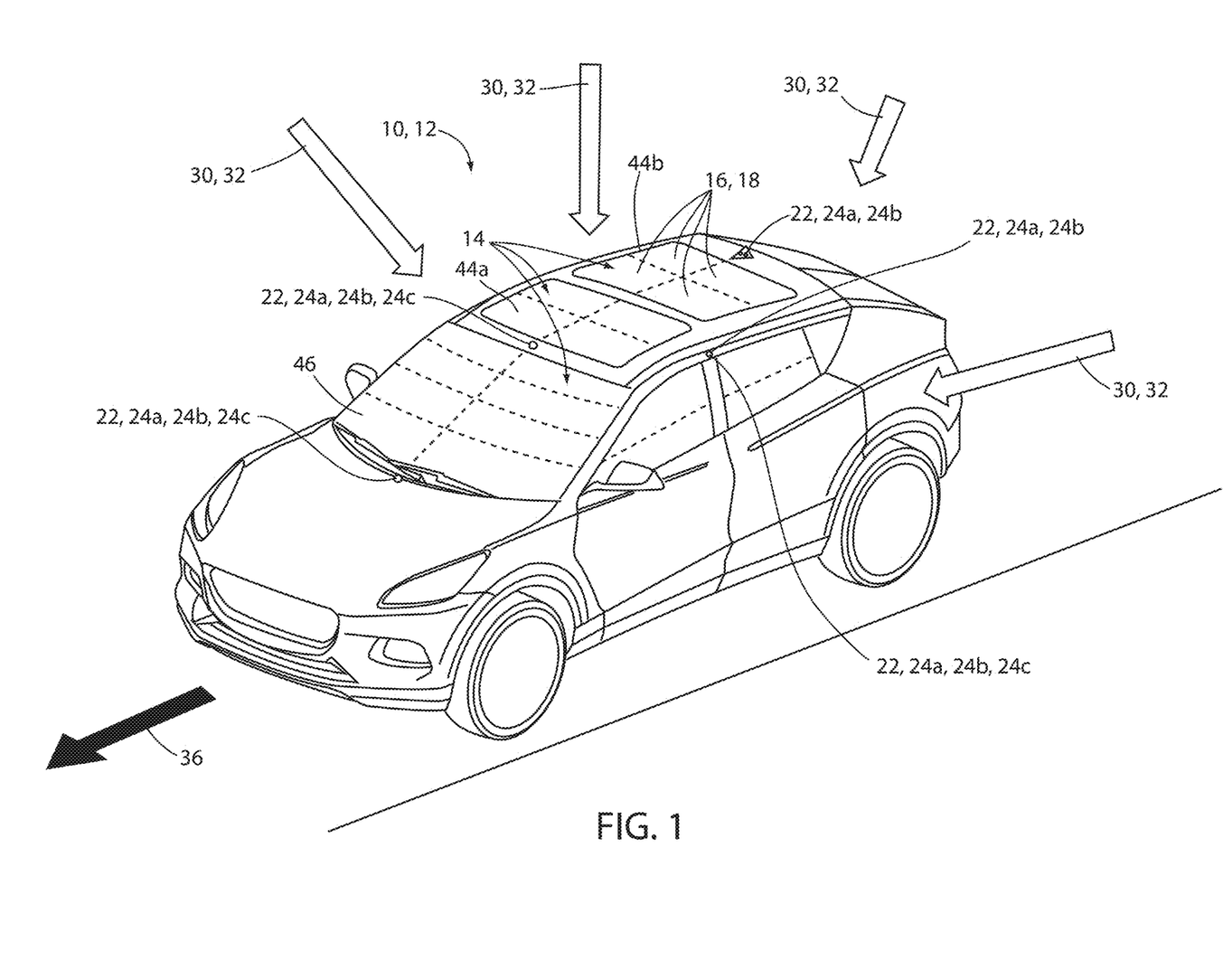
FIG. 1 is a projected view of a vehicle demonstrating a window control system configured to control a plurality of dimming windows.

For purposes of description herein, the terms "upper," "lower," "right," "left," "rear," "front," "vertical," "horizontal," and derivatives thereof shall relate to the invention as oriented in FIG. 1. It is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
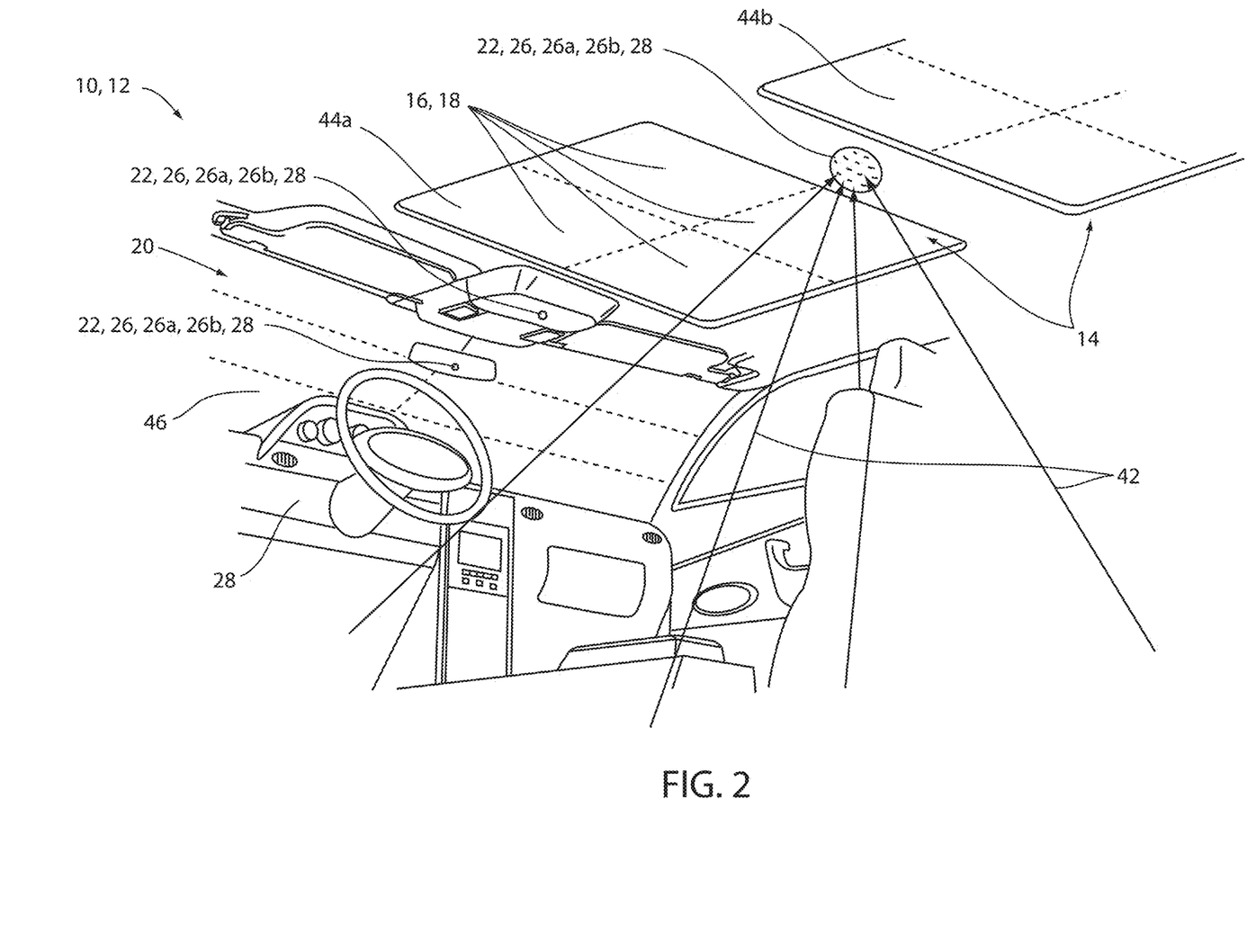
FIG. 2 is a projected view of a passenger compartment of a vehicle demonstrating a plurality of dimming windows.

Referring to FIGS. 1 and 2, a vehicle 10 is shown comprising a window control system 12. The window control system 12 is configured to control at least one dimming window 14 which may comprise a plurality of dimming zones 16. It should be understood that in this application, the plurality of dimming zones may be reduced to a single zone for each window 14. Each dimming window 14 or dimming zone 16 discussed herein may comprise an electrical or electronic device. The electronic device may comprise a light, user interface, electro-optic apparatus 18, etc. The electro-optic apparatus 18 may comprise a plurality of substrates comprising an electro-optic medium (e.g., electrochromic material or medium) disposed therebetween. Further detailed discussion of the electro-optic apparatus 18 is provided in reference to FIG. 3. In an exemplary embodiment, the window control system 12 may be configured to optimize comfort and visibility from a passenger compartment 20 of the vehicle 10 by controlling thermal load and glare that is transmitted through the dimming windows 14.

In various embodiments, the window control system 12 may comprise a plurality of sensors 22, which may be monitored in various combinations to identify environmental lighting conditions proximate the vehicle 10. In this configuration, a controller of the system 12 may automatically control a level of transmittance of light through each of the dimming windows 14 and/or dimming zones 16 as discussed herein. Referring to FIG. 1, the sensors 22 may comprise an exterior light sensor 24. The exterior light sensor 24 may include one or more of an ambient light sensor 24*a*, a directional light sensor 24*b*, or imager, and/or a plurality of light sensors 24*c* or imagers distributed over an exterior surface of the vehicle 10.

The ambient light sensor 24*a* may be configured to detect an ambient lighting condition of the environment proximate the vehicle 10. The directional light sensor 24*b* may be configured to identify both a light level and approximate direction of origin of light 30 impinging on the vehicle 10. The directional light sensor 24*b* may comprise a plurality of light sensors or imager modules configured to detect the level and direction of the light 30 impinging upon the vehicle 10. Similarly, the plurality of sensors 22 may correspond to a plurality of imagers or photodetectors distributed or positioned in various locations on the vehicle 10. Accordingly, the sensors 22 may be configured to monitor various external regions of the vehicle 10 to identify or map variations in the intensity of the light 30 impinging upon each of the regions of the vehicle 10. Each of the light sensors or imagers discussed herein may be implemented as Semi-Conductor Charge-Coupled Devices (CCD) or pixel sensors of complementary Metal-Oxide-Semi-Conductor (CMOS) technologies. The exterior light sensors 24 may be in communication with the controller of the system 12 such that the controller may identify an intensity and direction of the light 30 from a plurality of directions 32, which may substantially surround the exterior of the vehicle 10.

In some embodiments, the control system 12 may comprise a navigation system 34, which is shown and discussed later in reference to FIG. 9. The navigation system 34 may comprise a global positioning system (GPS) and/or a directional sensor (e.g., compass, magnetometer, etc.). Accordingly, based on a change in a position reported by the Global Positioning System (GPS) of the navigation system 34 and/or a heading direction identified by the directional sensor of the navigation system 34, the controller of the control system 12 may identify a heading direction 36 of the vehicle 10. Based on the heading direction 36, a time of day, and a region in which the vehicle 10 is operating, the controller may be configured to estimate a direction of the sun relative to the heading direction 36. Accordingly, the control system 12 may further be configured to utilize the estimated direction of the sun relative to the heading direction 36 of the vehicle 10 to control the transmittance of light through one or more of the dimming windows 14 and/or dimming zone 16 of the vehicle 10.

Referring now to FIG. 2, the passenger compartment 20 is shown demonstrating an interior light sensor 26 and an occupancy sensor 28. Similar to the exterior light sensor 24, the interior light sensor 26 may be implemented as a directional light sensor 26*a* or a plurality of light sensors 26*b* or imagers. In operation, the interior light sensor 26 may be configured to identify various regions of the vehicle 10, directions 42, and the corresponding intensity of the light 30 impinging upon the regions. Based on the relative intensity of each of the regions within the passenger compartment 20 of the vehicle 10, the controller of the control system 12 may be configured to generate and monitor a light intensity map of the passenger compartment 20. Based on the light intensity map, the controller of the control system 12 may be configured to control the transmittance of each of the dimming windows 14 and/or dimming zones 16 to control the light entering the passenger compartment 20 through each of the windows 14 and/or zones. In this way, the window control system 12 may monitor the intensity of light entering a plurality of regions within the passenger compartment 20 and control the transmittance of the light 30 to ensure that each region of the passenger compartment 20 is illuminated to a desired lighting level. The system 12 may thus provide for limiting imbalances or hotspots in the passenger compartment 20, which may result from intense light being transmitted through the windows 14.

In other embodiments, the system 12 may be employed to eliminate disabling glare which may occur when light originating from the exterior of the vehicle hits a display or other readout of the vehicle rendering it unreadable. Disabling glare or disability glare impairs the vision of objects without necessarily causing discomfort. Disability glare is often caused by the inter-reflection of light within the eyeball, reducing the contrast between task and glare source to the point where the task cannot be distinguished. In this case, the disabling glare light may not strictly be an imbalance or hot spot relative to other light within the vehicle. Dimming of the windows may, therefore, be employed to make the displays or readouts discernable. The interior sensors 26 may be located to detect the disabling glare so that the control system can respond accordingly.

In yet another embodiment, the window control system 12 may be used to eliminate discomfort glare. Discomfort glare results in an instinctive desire to look away from a bright light source or difficulty in seeing a task. In situations where the light entering the vehicle causes discomfort glare, the windows may be dimmed to a transmittance level where the intensity of the light entering the vehicle is reduced to an intensity where the occupant no longer experiences discomfort. A number of factors influence whether light entering the vehicle will result in discomfort glare. For example, the illuminance of the glare source (intensity of the luminous flux emitter per unit area of the source), the adaptation level (luminous flux reaching eye and setting the adaptation of the eyes), the solid angle of the glare source (size of the glare source as seen by the observer), the position index (correction factor considering the different perceptions of glare sources for the horizontal and vertical displacements from the line of vision of the observer), and various physiological and psychological sources can all influence whether a given light level rises to a discomfort level.

Since there is no universal model for conditions which result in discomfort glare, the control system 12 may comprise the ability to control the intensity of light entering the vehicle to different intensity levels. The sensors 26 may be employed to detect light at a given location and the control system 12 may employ a control algorithm wherein the electrical system to the window or plurality of segments such that the desired intensity level is attained. Furthermore, the control system 12 may adjust the window dynamically to adapt to changing environmental conditions or vehicle orientations so that the desired intensity level is maintained. It is understood that different people experience discomfort glare differently from others based on the factors described above. Therefore, the control system 12 may further comprise presets that correspond to different intensity levels which align with intensity levels different occupants associate with acceptable levels that avoid discomfort glare. It is further understood that the control system 12 may simultaneously adjust the plurality of zones for one or more windows such that the multiple different glare conditions are mitigated. In addition to the intensity presets that may correspond to intermediate darkening states, the control system 12 may also comprise settings, either manual or automatic, wherein the windows are put into a fully darkened or fully clear state.

In various embodiments, the window control system 12 may be operable to control the transmission of light passing through the dimming windows 14 in a plurality of regions in the vehicle 10. For example, the regions of the vehicle 10 may comprise a front passenger compartment, a rear passenger compartment, a driver side of a passenger compartment, a passenger's side of the passenger compartment, as well as additional rows or portions of the passenger compartment that may receive light through one or more dimming windows 14. A resolution or number of dimming zones 16 of the vehicle 10 that may be controlled by the controller of the control system 12 may vary based on the number of dimming windows 14 and corresponding dimming zones 16. As depicted in FIG. 2, a first sunroof panel 44a and a second sunroof panel 44b may each comprise four dimming zones 16. Each of the dimming zones 16 may comprise an electro-optic apparatus 18 that may be independently controlled by the controller of the control system 12 to adjust a transmittance of light passing therethrough. Additionally, a windshield 46 of the vehicle 10 is shown comprising six dimming zones 16. The number of dimming zones 16 may vary based on a desired operation of the control system 12 such that the system 12 may be implemented and scaled for a variety of applications.

In some embodiments, the system 12 may further comprise an occupancy sensor 28. The occupancy sensor 28 may correspond to an imager, which may be commonly implemented in the vehicle 10 as a single sensor combined with the directional light sensor 26a or the plurality of light sensors 26b. For example, in some embodiments, the interior light sensor 26 and the occupancy sensor 28 may correspond to one or more imagers having fields of view configured to capture various regions within the passenger compartment 20. In this way, a controller of the control system 12 may be operable to capture image data including images of occupants of the vehicle 10 as well as variations in the light intensity in the passenger compartment 20. In this configuration, the controller of the control system 12 may accurately identify the occupancy and light intensity within each of the regions within the passenger compartment 20. The occupancy sensor 28 may also be implemented in the vehicle 10 as one or more weight sensors 28b or various other sensors that may be utilized to identify the positions of occupants within the passenger compartment 20.

Referring again to FIGS. 1 and 2, in some embodiments, the control system 12 may utilize a combination of the direction 32 of the light 30 identified by the exterior light sensor 24 and the light intensity map captured by the interior light sensor 26. Additionally, the control system 12 may utilize information captured by the occupancy sensor 28 in combination with the light intensity map identified based on data from the interior light sensor 26 and/or the direction 32 of the light 30 impinging on the vehicle as identified based on information supplied by the exterior light sensor 24. Accordingly, the control system 12 may be configured to identify the direction 32 of the light 30 impinging on the vehicle. Based on the data captured by the sensors 22, the system 12 may control the dimming windows 14 and/or dimming zones 16 to ensure that the intensity of the light 30 is consistently transmitted into the vehicle to limit variations in the light intensity map.

Additionally, the controller of the control system 12 may identify the direction 32 of the light 30 impinging on the vehicle 10 in combination with one or more regions of the passenger compartment 20 where occupants are positioned. Based on the occupancy and the direction of the light 30, the system 12 may control one or more of the dimming windows 14 and/or dimming zones 16 to limit an intensity of the light 30 in the directions 32 that align with one or more of the occupants through one or more of the dimming windows 14 and/or dimming zones 16.

Figure 3:
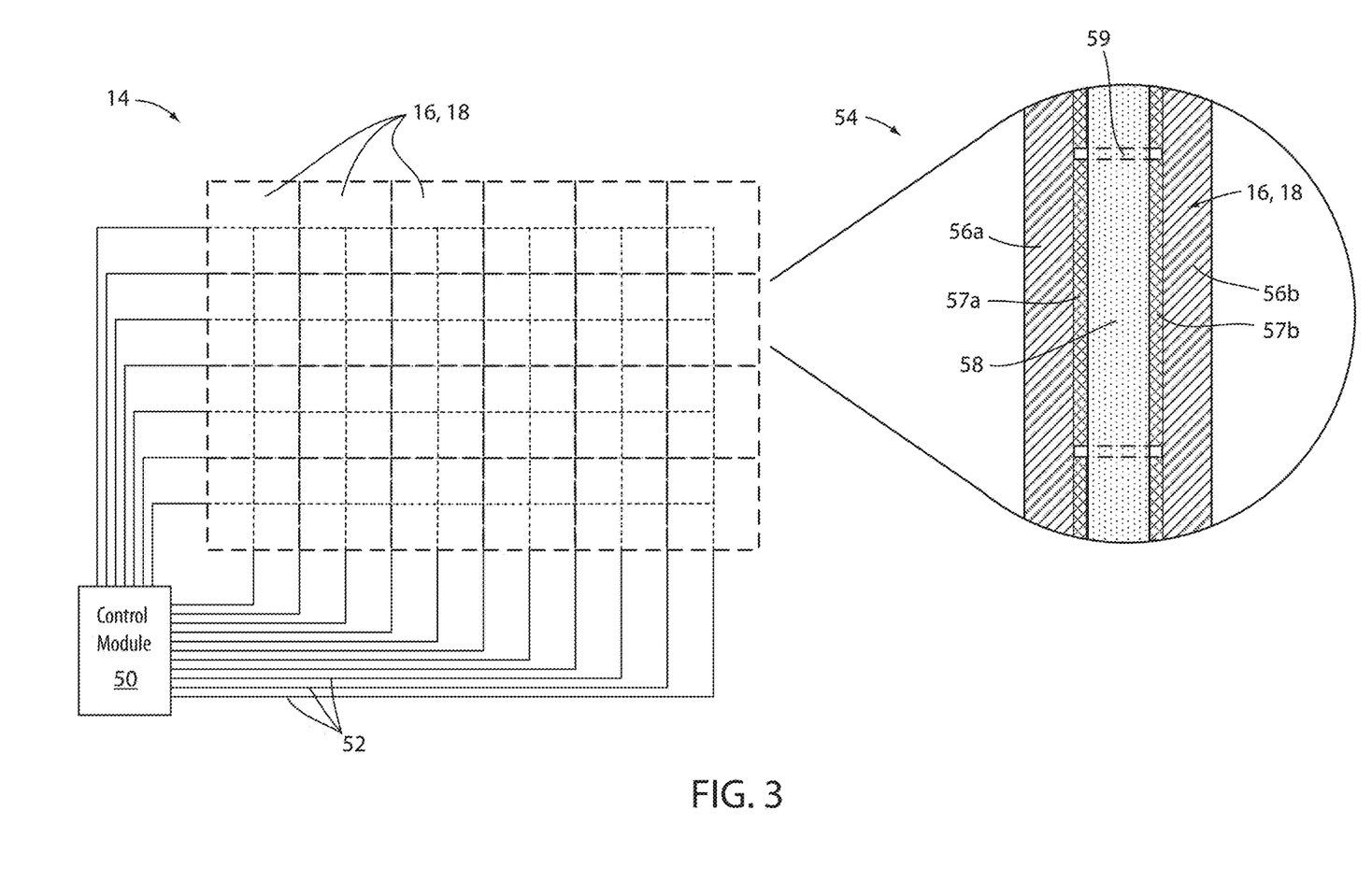
FIG. 3 is a schematic diagram of a dimming window including a detailed cross-sectional view of an electro-optic apparatus.

Referring now to FIG. 3, a schematic diagram of the dimming window 14 is shown demonstrating a plurality of dimming zones 16. As demonstrated, each of the dimming zones 16 is communicatively connected to a window control module 50. In this configuration, the window control module 50 may be operable to control a voltage, or other electrical attribute, supplied to each of the dimming zones 16 by a plurality of leads 52. By controlling signals or voltages supplied to the leads 52, the control module 50 may control a variable transmittance through the electro-optic material of each of the electro-optic apparatuses 18 forming the dimming zones 16. The conductive leads 52 may be in conductive connection with each of the dimming zones 16 via a plurality of transparent, opaque, or transflective conducting layers which may form a matrix of conductive paths configured to independently communicate electrical signals from the window control module 50 to each of the dimming zones 16.

As demonstrated in FIG. 3, a detailed cross section 54 of the dimming window 14 is shown demonstrating a stacked structure of an exemplary configuration of the dimming zone 16. The dimming zone 16 may comprise a first substrate 56a oriented to a second substrate 56b in a spaced apart configuration. An electro-optic medium 58 (e.g., electrochromic material) may be enclosed between the first substrate 56a and the second substrate 56b. A first transparent electrode 57a may be disposed between the first transparent substrate 56a and the electro-optic medium 58, and a second transparent electrode 57b may be disposed between the second substrate 56b and the electro-optic medium 58. Each of the dimming zones 16 may be partitioned and/or separated by a substantially transparent divider 59. In this configuration, each of the dimming zones may be conductively separated and distinct such that the window control module 50 of the control system 12 may independently control the transmittance of light through each of the dimming zones 16. Accordingly, each of the dimming windows 14 may provide for the dimming zones 16 to vary in transmittance independently in response to a voltage potential or other electrical property or signal applied to the leads 52.

In an exemplary embodiment, an electro-optic medium 58 may be used as a laminate to hold the first substrate 56a and the second substrate 56b together. The electro-optic apparatus 18 and substrates 56a, 56b may be formed of various materials. For example, the substrates 56a and 56b may be of plastic. Plastics for the substrates may include, but are not limited to, a clear polycarbonate, polyethylene terephthalate (PET), polyamide, acrylic, cyclic olefin, polyethylene (PEN), metallocene polyethylene (mPE), silicone, urethane, and various polymeric materials. The substrates 56 may also be of various forms of glass, including, but not limited to, soda lime float glass, borosilicate glass, boro-aluminosilicate glass, or various other compositions. When using glass substrates, they can be annealed, heat strengthened, chemically strengthened, partially tempered or fully tempered. The electro-optic apparatus 18 can be held by a partial or full frame that may be used to support and move the window 14 as desired.

The substrates 56 as well as one or more protective coatings may be adhered together by one or more cross-linked materials. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as heavily cross-linked materials to adhere to one or more of the substrates 56a, 56b and/or additional protective layers. Accordingly, the specific examples described herein are to be considered non-limiting examples.

In some embodiments, the electro-optic apparatus 18 may be configured to conform to one or more standards. An example of such a standard may include a ball drop test of the Federal Motor Vehicle Safety Standards (FMVSS). In this test, the window 14 may be required to withstand the impact of an approximately 225 gram (8 ounce) steel ball dropped from 9 meters under normal gravitational force on earth (i.e., approximately 9.8 m/s2). In order to successfully pass the ball drop test, the window 14 must prevent the steel ball from penetrating through the window 14. Accordingly, the electro-optic apparatus may be configured to conform to SAE Z26.1 tests 9 and 12 for FMVSS test for impact strength and similar test. Further discussion and examples of structures that may be utilized for the electro-optic apparatus 18 are discussed in U.S. Pat. No. 10,668,789 entitled "SUNROOF INCORPORATING ELECTRO-OPTIC ELEMENT," the disclosure of which is incorporated herein by reference in its entirety.

In some embodiments, the electro-optic apparatus 18 may comprise memory chemistry configured to retain a state of transmittance when the vehicle 10 and the system 12 are inactive (e.g. not actively supplied energy from a power supply of the vehicle 10). That is, the electro-optic apparatus 18 may be implemented as an electrochromic device having a persistent color memory configured to provide a current during clearing for a substantial time period after being charged. An example of such a device is discussed in U.S. Pat. No. 9,964,828 entitled "ELECTROCHEMICAL ENERGY STORAGE DEVICES," the disclosure of which is incorporated herein by reference in its entirety.

The electro-optic apparatus 18 as discussed herein may be configured to vary a transmission of light at least through the substrates 56a and 56b in the various embodiments of the windows, windscreens, and/or sunroofs discussed herein. The electro-optic apparatus 18 may correspond to an electrochromic device being configured to vary the transmissivity of the sunroof assemblies discussed herein in response to an applied voltage from one or more of the control modules 50. Examples of control circuits and related devices that may be configured to provide for electrodes and hardware configured to control the electro-optic apparatus 18 are generally described in commonly assigned U.S. Pat. No. 8,547,624 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of each of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of each of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which are incorporated herein by reference in its entirety. In other embodiments, the electro-optic device may comprise a suspended particle device, liquid crystal, or other system that changes transmittance with the application of an electrical property.

Figure 4A:
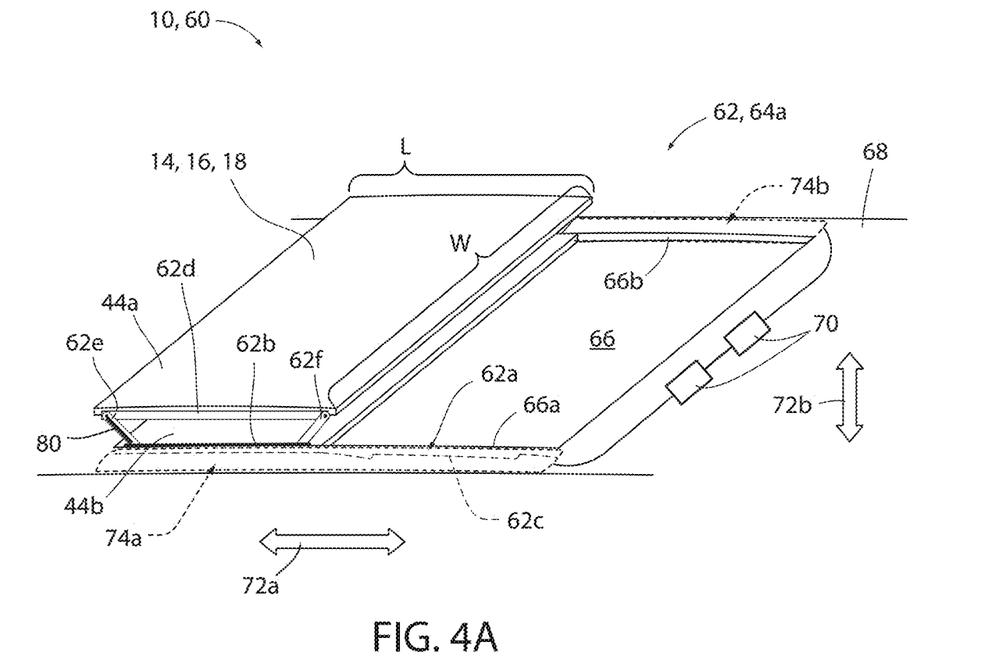
FIG. 4A is a projected view of a panoramic sunroof comprising a positioning mechanism in an open position.
Figure 4B:
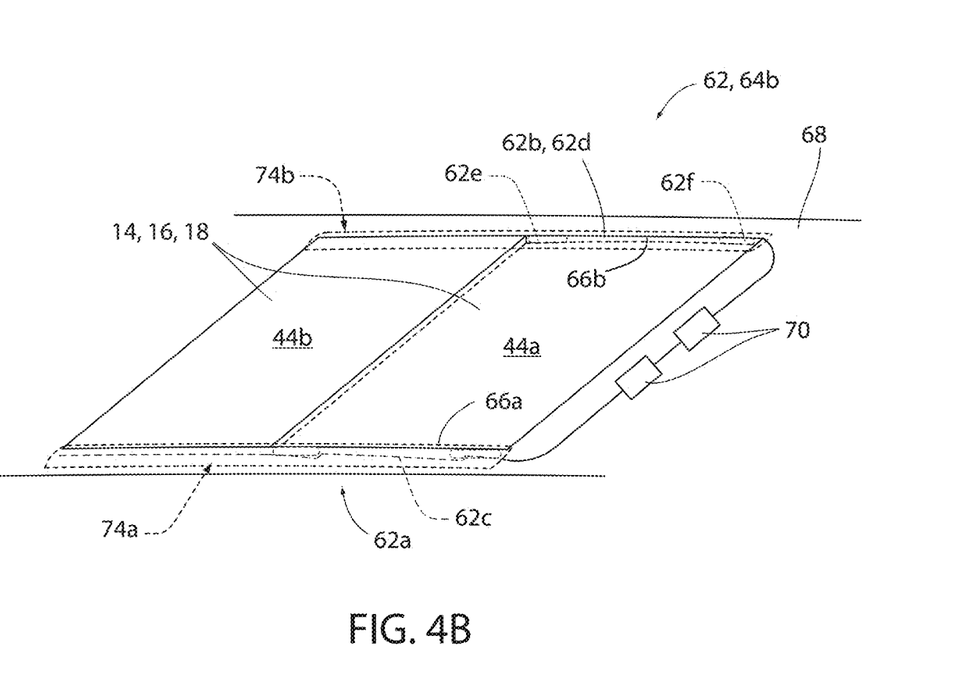
FIG. 4B is a projected view of the panoramic sunroof configured in a closed position.

Referring now to FIGS. 4A and 4B, a panoramic sunroof 60 is shown comprising a positioning mechanism 62. The panoramic sunroof 60 may comprise the first sunroof panel 44a and the second sunroof panel 44b. As previously discussed, the first sunroof panel 44a and the second sunroof panel 44b may comprise one or more electro-optic apparatuses 18 (e.g., the dimming window 14 and/or the dimming zone 16). In this configuration, the disclosure may provide for a positioning assembly comprising the positioning mechanism 62 configured to selectively position the first sunroof panel 44a from an open position 64a to a closed position 64b as illustrated in FIGS. 4A and 4B, respectively. Though a panoramic sunroof is shown and discussed herein, the apparatus and methods discussed may be similarly applied to any form of sunroof (e.g., single sunroof panels that retract into the cavity between the vehicle roof and headliner and single panels that retract above the roof of the vehicle).

In an exemplary embodiment, the first sunroof panel 44a may be selectively positioned by the positioning mechanism 62 to reveal or enclose an opening 66 formed by one or more panels 68 of the vehicle 10. The positioning mechanism 62 may comprise a positioning track 62a configured to receive and guide an adjustment block 62b along a profile path 62c. The adjustment block 62b may be in connection with a sunroof frame 62d via a first attachment link 62e and a second attachment link 62f. As illustrated in FIG. 4A, the opening 66 comprises a first side 66a and a second side 66b. Accordingly, the positioning mechanism 62 and related components (e.g., 62a-62f) may be mirrored across the opening 66 on the second side 66b.

In operation, the positioning mechanism 62 may slidably engage the adjustment block 62b such that the adjustment block 62b is guided along the positioning track 62a. The location of the adjustment block 62b may be adjusted by the positioning mechanism 62 by controlling one or more actuators or motors 70, which may be controlled by a user interface positioned in the passenger compartment 20 of the vehicle 10. In this configuration, the positioning mechanism 62 may be configured to selectively position the adjustment block 62b and the first sunroof panel 44a in response to the input of the user interface.

Between the open position 64a and the closed position 64b, the positioning mechanism 62 may guide the first sunroof panel 44a along the profile path 62c. In response to the position along the profile path 62c, the attachment links 62e, 62f may adjust a height of the sunroof frame 62d relative to the at least one panel 68. Additionally, the positioning mechanism 62 may control a movement of the sunroof frame 62d and the first sunroof panel 44a such that the first sunroof panel 44a slides along a length L. In this configuration, the positioning mechanism 62 may be configured to selectively adjust a lateral movement 72a as well as a vertical movement 72b such that the first sunroof panel 44a may be positioned between the closed position 64b and the open position 64a. In the open position 64a, the first sunroof panel 44a may be positioned substantially above or otherwise stacked with the second sunroof panel 44b.

In an exemplary embodiment, a plurality of troughs 74a and 74b may extend along the first side 66a and the second side 66b, respectively. Each of the troughs 74a and 74b may be substantially enclosed by the panels 68 such that an internal passage is formed between the one or more panels 68 and a headliner or various additional body components forming a roof of the vehicle 10. The troughs 74a, 74b may be configured to provide a passage for one or more components of the positioning mechanism 62 such that the adjustment block 62b may be freely positioned providing for the lateral movement 72a. In some embodiments, the troughs 74a, 74b may be configured to guide and/or receive a control connection configured to communicate one or more control signals from the controller of the system 12 to the electro-optic apparatus 18. In this way, the controller of the system may be configured to control one or more visual properties of the electro-optic apparatus 18 incorporated in each of the sunroof panels 44a, 44b.

Referring now to FIGS. 5, 6, 7, and 8, detailed schematic views of a plurality of connection configurations are shown for the control connection 80. Each of the connection configurations may be operable to provide communication between the controller 82 of the system 12 and the electro-optic apparatus 18 of the first sunroof panel 44a in the first position 64a, the second position 64b, and intermediate positions therebetween. Referring first to FIGS. 5A and 5B, a first control connection 80a is shown comprising a coiled cable 84 disposed in the trough 74a. Though the first control connection 80a as well as the additional control connections 80 discussed herein are shown disposed in the first trough 74a, it shall be understood that the control connections 80 may be positioned in either of the troughs 74a, 74b. In operation, the coiled cable 84 may connect to the electro-optic apparatus proximate the second attachment link 62f. In this configuration, the coiled cable 84 may be compressed within the first trough 74a in the open position 64a and may extend within the first trough 74a in the closed position 64b.

Figure 5A:
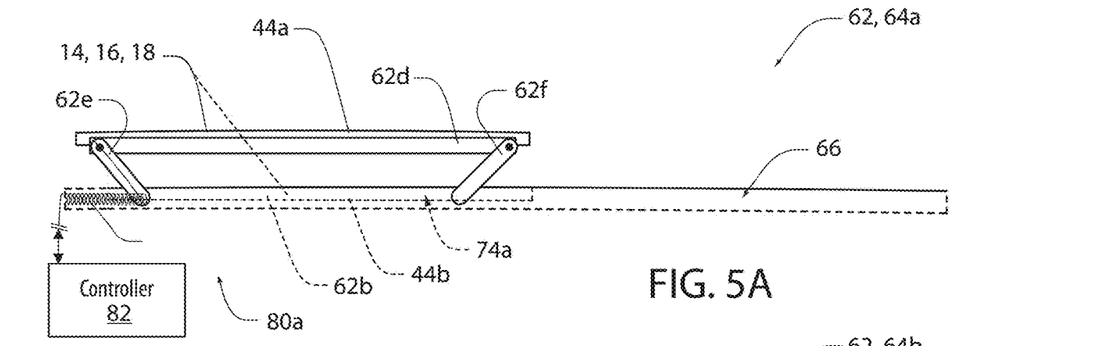
FIGS. 5A and 5B are detailed schematic views of a positioning apparatus for a sunroof panel.
Figure 5B:
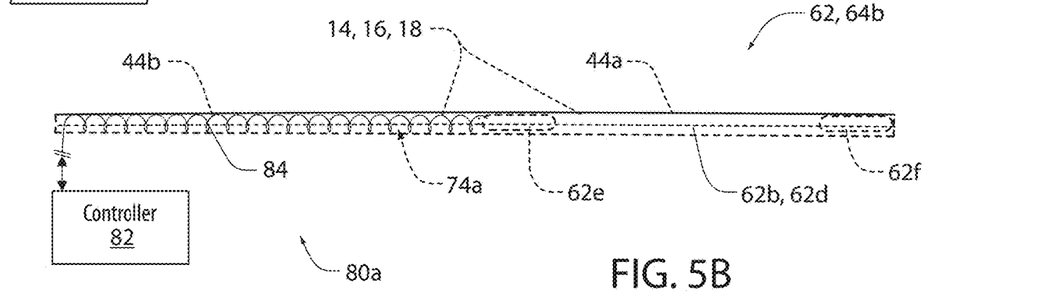

In operation, the first control connection 80a may provide for the electro-optic apparatus 18 to remain in communication with the controller 82 in the open position 64a, the closed position 64b, and the intermediate positions therebetween. In some embodiments, it may be advantageous to connect the coiled cable to the link 62f due to a straight portion of the coiled cable 84 being operable to provide strain relief for the connection made to the panel 44a near the link 62f. However, the location of the connection may change, and the connection of the control connection 80 to the first panel 44a may be made anywhere to suit the application of the mechanism 62. Accordingly, the control connection and conductive communication interfaces between the electro-optic apparatus 18 incorporated in each of the sunroof panel 44a and the vehicle 10.

Figure 6A:
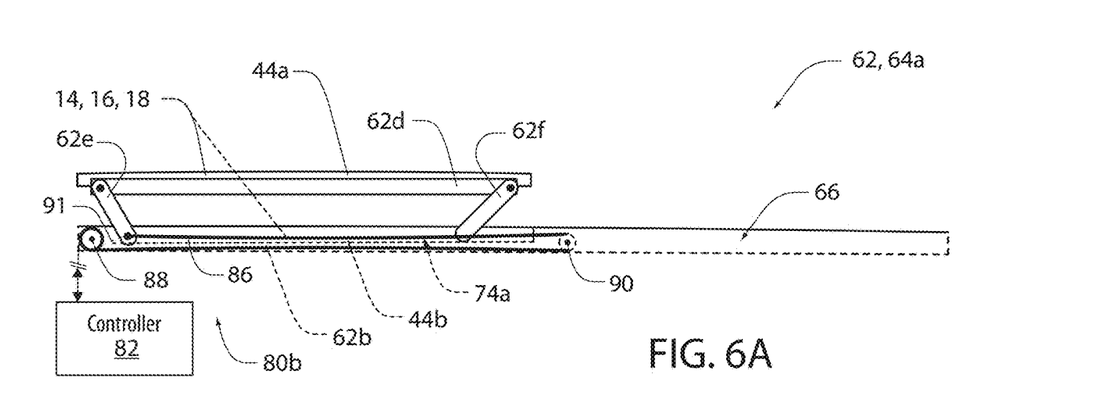
FIGS. 6A and 6B are detailed schematic views of a positioning apparatus for a sunroof panel.
Figure 6B:
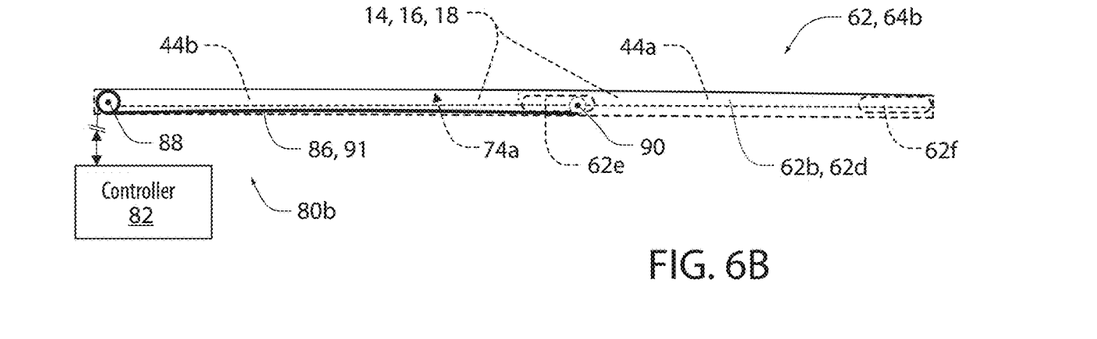

Referring now to FIGS. 6A and 6B, a second control connection 80b is shown. The second control connection 80b may comprise a retractable cable 86, which may be in the form of a ribbon cable or various flexible cables configured to wind on a retracting spindle 88. The retractable cable 86 may extend from the retracting spindle 88 over a guide spindle 90 and connects to the electro-optic apparatus 18 proximate the second link 62f. In this configuration, the retractable cable 86 may extend and unwind from the retracting spindle 88 in the open position 64a. Additionally, the retracting spindle 88 may retrieve the retractable cable 86 via a spring-winding mechanism such that the retractable cable 86 is wound around the retracting spindle 88 and guided around the guide spindle 90 in response to the first sunroof panel 44a changing position from the open position 64a to the closed position 64b.

In some embodiments, the retracting spindle 88 may connect directly to the first link 62e without extending around the guide spindle 90. Such an embodiment may differ in the depiction shown in FIG. 6A by connecting over the direct path 91 for the retractable cable. The omission of the guide spindle 90 in FIG. 6B would only change the depiction shown by removing the guide spindle 90 and maintaining the approximate path of the retractable cable 86 as shown. Accordingly, the second control connection 80b may be implemented with or without the guide spindle 90 to suit a desired application.

Figure 7A:
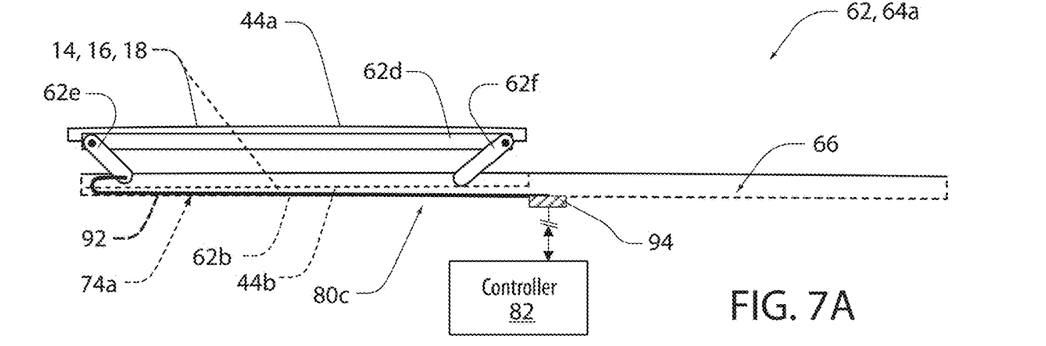
FIGS. 7A and 7B are detailed schematic views of a positioning apparatus for a sunroof panel.
Figure 7B:
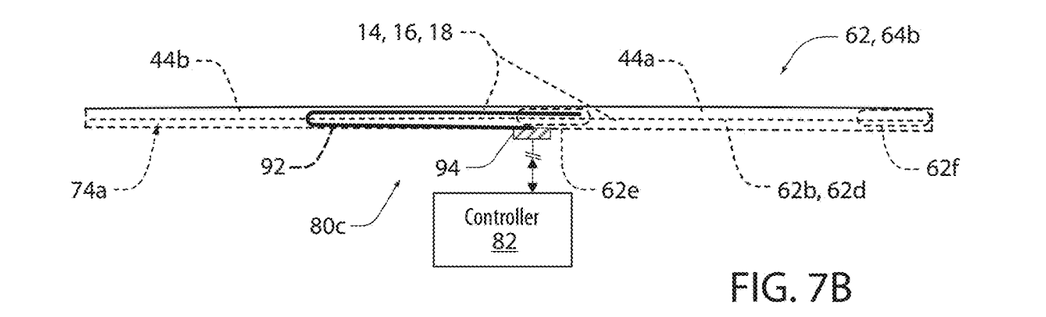

Referring now to FIGS. 7A and 7B, a third control connection 80c is shown connecting the controller 82 to the electro-optic apparatus 18. The first control connection 80c may comprise an articulating flex cable 92, which may be in the form of a drag chain cable, ribbon, or other similar forms of cable connections. The articulating flex cable 92 may extend through the first trough 74a from a control connection 94 which may be disposed proximate to an abutment between the first sunroof panel 44a and the second sunroof panel 44b. The abutment may correspond to a parting line or seal disposed between the sunroof panels 44a and 44b. In this configuration, the articulating flex cable 92 may extend through the first trough 74a in the open position 64a and overlap or coil over itself in the closed position 64b.

Figure 8A:
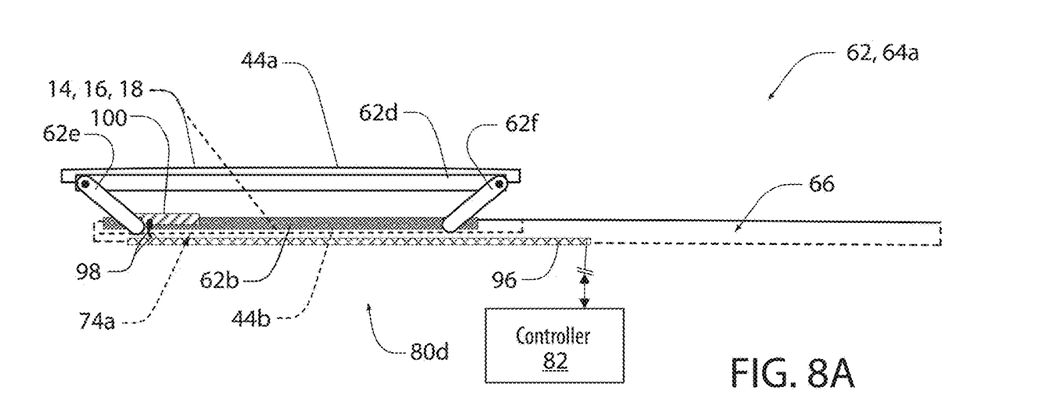
FIGS. 8A and 8B are detailed schematic views of a positioning apparatus for a sunroof panel.
Figure 8B:
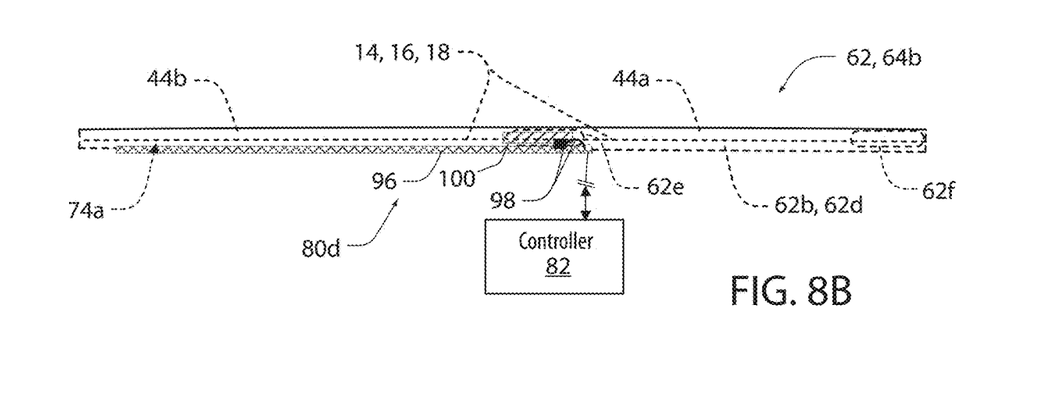

Referring now to FIGS. 8A and 8B, a fourth control connection 80d is shown connecting the electro-optic apparatus 18 communicatively to the controller 82. The fourth control connection 80d may comprise a conductive circuit 96 disposed in the first trough 74a. The conductive circuit 96 may comprise a plurality of conductive traces, which may be aligned with a plurality of spring elements 98. The spring elements 98 may be connected to a control circuit 100 mounted to the adjustment block 62b. In some embodiments, the control circuit may similarly be mounted to the sunroof frame 62d and/or the links 62e, 62f. In operation, the spring elements 98 may slide along the conductive traces of the conductive circuit 96 within the first trough 74a. Throughout the later motion of the adjustment block 62b, the spring elements 98 or fingers may extend to maintain contact between the conductive traces of the conductive circuit 96 and the control circuit 100. In this way, the fourth control connection 80d may be configured to maintain the communicative connection between the controller 82 and the electro-optic apparatus 18 in response to both the lateral movement 72a and the vertical movement 72b of the first sunroof panel 44a when positioned in the open position 64a, the closed position 64b, and the intermediate positions therebetween.

Figure 9:
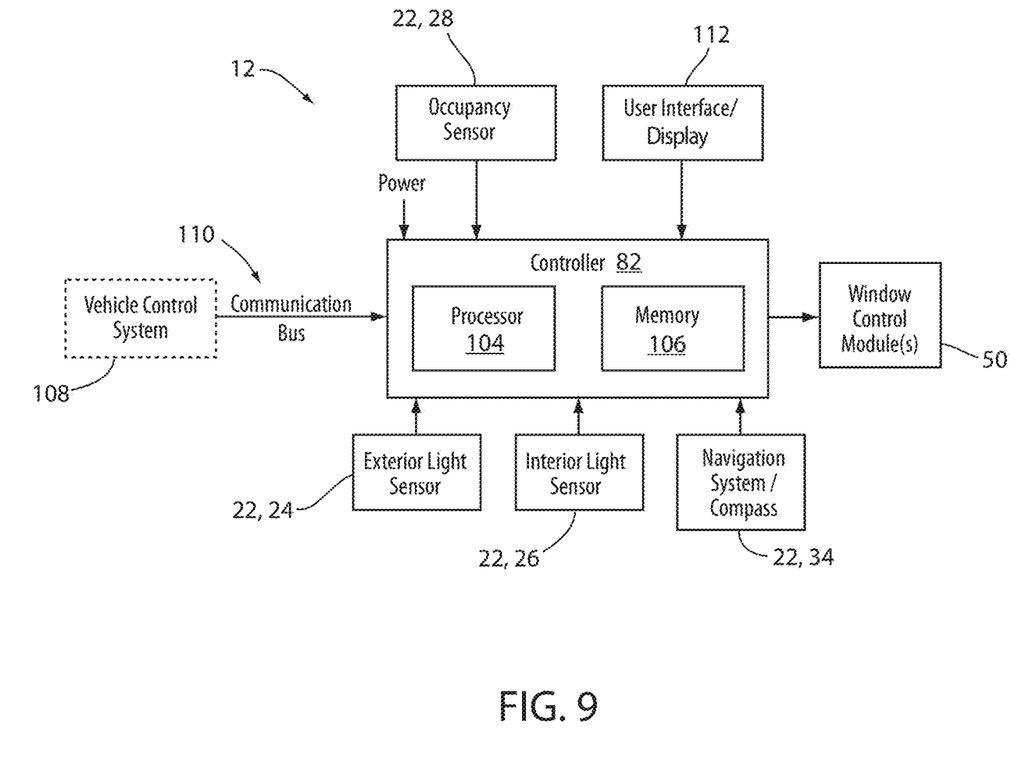
FIG. 9 is a block diagram of a window control system in accordance with the disclosure.

Referring to FIG. 9, the control system 12 is shown demonstrating the controller 82 in communication with one or more of the sensors 22. The sensors 22 may comprise the exterior light sensor 24, the interior light sensor 26, and/or the occupancy sensor 28. As previously discussed, the exterior light sensor may correspond to one or more of an ambient light sensor 24a, a directional light sensor 24b, and/or a plurality of light sensors and/or imagers 24c. The interior light sensor 26 may correspond to a directional light sensor 26a or directional imager and/or a plurality of light sensors 26b or imagers, which may be distributed within the passenger compartment 20 of the vehicle 10. The occupancy sensor 28 may correspond to an imager, similar and/or commonly implemented with the interior light sensor 26, a weight sensor, and/or a variety of additional sensors that may be utilized to detect an occupancy within the passenger compartment 20 of the vehicle 10. In some embodiments, the controller 82 may additionally be in communication with a user interface 112 which may be disposed in the passenger compartment 20 of the vehicle 10. The user interface 112 may provide for manual control of the dimming windows 14 and/or dimming zones 16 as discussed herein.

The controller 82 may include a processor 104, which may comprise one or more circuits configured to process data received from the sensors 24-28. The processor 104 may be in communication with a memory 106, which may be configured to store various instructions and routines configured to control the window control module 50 or modules in communication with the controller 82. In various embodiments, the controller 82 may be in communication with a vehicle control module 108 via a communication bus 110. The communication bus 110 may be configured to deliver signals to the controller 82 identifying various states of the vehicle 10. For example, the communication bus 110 may be configured to communicate an operating condition of the vehicle (e.g., an ignition activation, drive gear selection, occupancy detection, headlight operation, etc.) or any other information or control signals that may be communicated by the communication bus 110. Accordingly, the control system 12 may provide for a flexible solution to control dimming windows 14 and/or dimming zones 16 to improve the lighting and comfort for occupants of the vehicle 10.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vehicle apparatus configured to selectively position and enclose an opening formed in at least one panel of a vehicle, the apparatus comprising:
   a sliding glass panel comprising a first electro-optic device comprising a first plurality of independently controlled dimming zones in communication with a control circuit of the vehicle;
   a fixed glass panel comprising a second electro-optic device comprising a second plurality of independently controlled dimming zones in communication with the control circuit of the vehicle;
   at least one light sensor configured to detect a light intensity map of a passenger compartment of the vehicle;
   a positioning mechanism configured to slidably position the sliding panel along a positioning track between an open position and a closed position; and
   a control connection configured to transmit control signals between the control circuit of the vehicle and the electrical device, wherein the control connection extends from a portion of the vehicle to a connection interface of the electrical device, wherein the control connection is configured to communicate a control signal to adjust a transmittance of each of the first plurality of dimming zones and the second plurality of dimming zones in coordination in both the open position and the closed position, wherein the transmittance is controlled through the first plurality of dimming zones and the second plurality of dimming zones limiting lighting imbalances identified in response to the light intensity map of the passenger compartment.

2. The apparatus according to claim 1, wherein the positioning track extends along a first side and a second side of the opening approximately coextensive to a length of the sliding glass panel.

3. The apparatus according to claim 1, wherein the positioning mechanism is configured to adjust a position of the electro-optic apparatus approximately along the length of the sliding glass panel, such that the open position substantially reveals the opening.

4. The apparatus according to claim 1, further comprising:
   a trough extending along a portion of the positioning track, wherein the control connection passes through the trough.

5. The apparatus according to claim 4, wherein the control connection comprises a connection apparatus configured to guide the control connection through the trough and maintain connection with the electrical device throughout the positioning from the open position to the closed position.

6. The apparatus according to claim 5, wherein the control connection comprises a coiled cable configured to extend and compress in the trough between the open position and the closed position.

7. The apparatus according to claim 5, wherein the electrical device is an electro-optic element of a window, and wherein the control connection comprises a spindle configured to receive a retractable cable that electrically connects the electro-optic element with the control circuit.

8. The apparatus according to claim 7, wherein the retractable cable extends through the trough and the spindle receives an excess length of the retractable cable between the open position and the closed position.

9. The apparatus according to claim 5, wherein the control connection comprises a conductive circuit comprising a plurality of conductive traces extending through the trough along the length of the window elements.

10. The apparatus according to claim 9, wherein the control connection comprises a plurality of conductive spring elements in connection with the window element.

11. The apparatus according to claim 10, wherein the conductive spring elements are configured to conductively engage the conductive traces between the open position and the closed position.

12. A method for supplying a control signal to an electro-optic device incorporated in a sliding panel of a vehicle, the method comprising:

controlling a position of the sliding panel in a positioning track from an open position to a closed position;
 controlling a light transmittance through a plurality of dimming zones of the sliding glass panel;
 controlling a light transmittance through a plurality of dimming zones of a fixed glass panel;
 detecting a light intensity map of a passenger compartment of the vehicle;
 maintaining an electrical communication with the electro-optic device between the open position to the closed position via a control connection;
 guiding the control connection between the open and closed positions in a trough extending along a portion of the positioning track; and
 communicating control signals thereby controlling the transmittance of the first plurality of dimming zones and the second plurality of dimming zones in coordination, wherein controlling the transmittance adjusts lighting imbalances identified in response to the light intensity map in the open position, the closed position, and intermediate positions therebetween.

13. The method according to claim 12, further comprising:

communicating the control signals via the trough extending along a length of the sliding panel.

* * * * *